United States Patent [19]
Harbeke

[11] Patent Number: 4,888,925
[45] Date of Patent: Dec. 26, 1989

[54] FIRE-RETARDANT FLUID COUPLING ASSEMBLY AND METHOD

[76] Inventor: Gerold J. Harbeke, 2443 Waterside Cir., Lakeworst, Fla. 33461

[21] Appl. No.: 201,146

[22] Filed: Jun. 2, 1988

Related U.S. Application Data

[63] Continuation-in-part of Ser. No. 116,174, Nov. 3, 1987.

[51] Int. Cl.$^4$ ............................................. E04C 1/06
[52] U.S. Cl. ...................................... 52/232; 52/577; 137/75
[58] Field of Search ......................... 52/232, 317, 577; 285/56, 58, 59, 60; 137/75

[56] References Cited

U.S. PATENT DOCUMENTS

| | | | |
|---|---|---|---|
| 4,109,423 | 8/1978 | Perrain | 52/232 |
| 4,136,707 | 1/1979 | Gaillot et al. | 52/232 |
| 4,221,092 | 9/1980 | Johnson | 52/232 |
| 4,307,546 | 12/1981 | Dolder | 52/232 |
| 4,467,577 | 8/1984 | Licht | 52/232 |
| 4,642,956 | 2/1987 | Harbeke | 52/232 |
| 4,748,787 | 6/1988 | Harbeke | 52/232 |

FOREIGN PATENT DOCUMENTS 2536565 2/1977 Fed. Rep. of Germany ........ 52/232

OTHER PUBLICATIONS

3M–Fire barrier Restricting Collar RC–1, Electrical Products Division/3M.

Primary Examiner—Michael Safavi
Attorney, Agent, or Firm—Griffin, Branigan & Butler

[57] ABSTRACT

A pipe coupling assembly (10, 46, 64) and method of manufacturing the same involves the use of a pipe coupling (12, 50, 66) with an intumescent collar (14, 68) and a metallic band (16, 56, 70) wrapped thereabout at one end thereof. The metallic band has overlapping ends (36, 38) which are held together by elongated fasteners (18, 60) passing through overlapping portions and into the intumescent wrap. The pipe coupling assembly including a tubularly-shaped main body, an intumescent collar, and a metallic band are assembled as a unit in a factory to be later placed in a concrete form to have concrete poured thereabout. A heat receiving edge of the metallic band receives heat from a fire in a space below a barrier in which the pipe coupling assembly is embedded and conducts it to the outer periphery of the intumescent collar. In one embodiment, a first end edge of a metallic band (106) has radially-directed heat receiver tabs (114) extending across a first end edge (116) of an intumescent collar (104) located at a first end (110) of a pipe coupling (102) to be mounted to a concrete form (112). The other end edge (128) of the metallic band (106) is spaced from a second end edge (118) of the intumescent collar. The second end edge of the intumescent collar is abutted firmly against a protective flange (109) which is molded as part of the pipe coupling and which covers the whole second end edge of the intumescent collar.

22 Claims, 2 Drawing Sheets

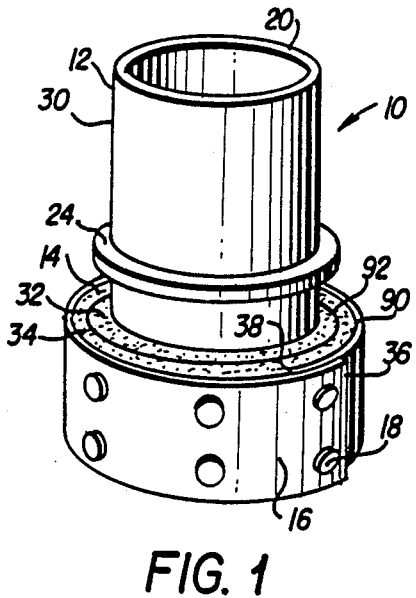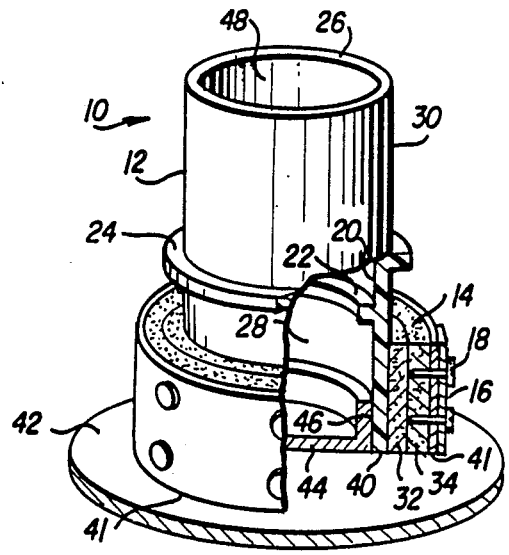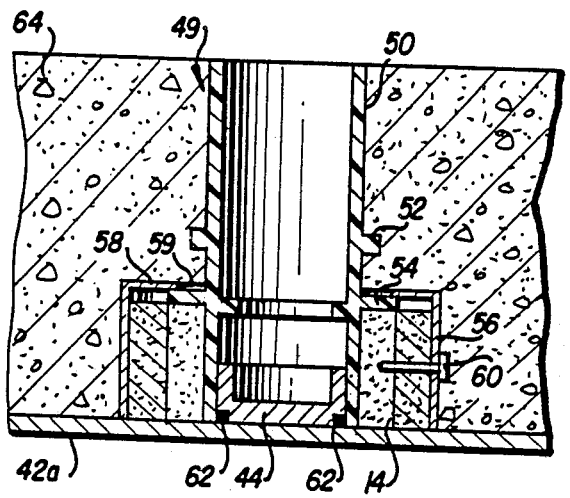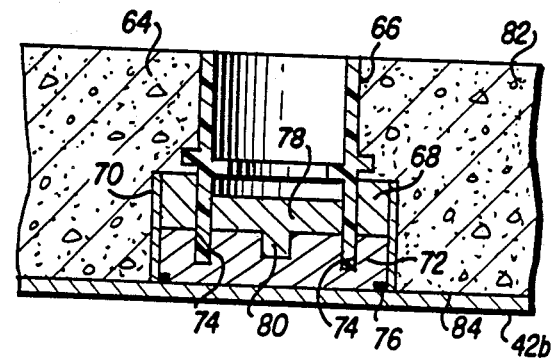

FIRE-RETARDANT FLUID COUPLING ASSEMBLY AND METHOD

BACKGROUND OF THE INVENTION

This application is a continuation-in-part of application Ser. No. 116,174, filed Nov. 3, 1987.

This invention relates generally to the art of pipe networks for buildings, and especially to apparatus and systems for making pipe networks more fire-retardant.

Until recently, pipe networks were normally extended through floors of buildings by forming holes in the floors—e.g. by using void-forming devices during "pouring" of the floors, by knocking out holes, by boring such holes after the floors have been formed, etc.—and thereafter extending pipes through these holes. Normally, the holes were made to be bigger than the pipes to ensure that one could easily extend the pipes through the holes. Thereafter, it was necessary for workmen to fill these spaces between the pipes and the holes with grout or some other substance in order to meet fire codes which generally do not allow unfilled holes in floors.

There have been a number of patents issued, such as German Pat. No. 2,615,428, U.S. Pat. No. 4,453,354 to Harbeke and U.S. Pat. No. 4,261,598 to Cornwall disclosing the concept of cementing pipe coupling joints into floors when floors are poured and thereafter mating external pipes to female opposite ends of the embedded coupling joints. Such practice is normally carried out with plastic pipe, however, it could also be carried out with pipes made of other materials.

A major problem which still existed for pipe coupling joints which were embedded in floors was that when there was a fire the fire would melt the external plastic pipe and would then pass up through the pipe-coupling joints to the next floor. In other words, the pipe-coupling joints themselves served as ventilation holes for fires. U.S. Pat. No. 4,642,956 to Harbeke solved this major problem by disclosing the concept of wrapping intumescent-material collars about pipe coupling joints and then pouring wet concrete in forms about the couplings and the intumescent collars. Although the method and apparatus disclosed by Harbeke in U.S. Pat. 4,642,956 provides vast improvements over those systems which already existed, there are additional improvements which could be made.

One problem with the Harbeke system of Patent 4,642,956 is that it is rather difficult for plumbers and other construction workers to form collars with intumescent material which they attached to couplings prior to the couplings being cemented into barriers Also, it is difficult to prepackage couplings with intumescent wrap because intumescent material is subject to damage with rough handling It is therefore an object of this invention to provide a pipe coupling assembly with an intumescent collar which is sturdy and resistent to damage caused by blows and rough handling and which can therefore be prepackaged prior to the transportation and sale.

Another difficulty with the fire-retardant fluid coupling assembly and method described by Harbeke in U.S. Pat. No. 4,642,956 is that the intumescent collar does not respond as quickly as is possible to the heat of a fire because such fire heat is absorbed or conducted away, by the surrounding concrete. Thus, it is an object of this invention to provide a pipe coupling assembly having an intumescent-material collar which responds quickly to heat to close off the pipe coupling in case of fire in a floor below.

It is a further object of this invention to provide a pipe coupling assembly having an intumescent-material collar which is easy and relatively inexpensive to construct, but yet pleasing in appearance, quite durable, and effective in responding to heat.

SUMMARY

According to principles of this invention, a pipe coupling assembly product includes a tubularly-shaped main body with an intumescent collar wrapped thereabout at a first end thereof and a closed metallic band wrapped about the intumescent collar. A heat reception edge of the metallic band is approximately aligned with the first end of the tubularly-shaped main body. The metallic band is comprised of a strip whose ends are attached to one another by fasteners which pass through the metallic-band ends into the intumescent collar. The metallic band is pulled tightly to cause the intumescent collar to close tightly on the tubular-shape main body to be held thereon by friction. The metallic band serves to protect and hold the intumescent collar together and provides a heat conductor at the circumferential surface of the intumescent collar.

In one embodiment, a first end edge of a metallic band has radially-directed heat receiver tabs extending across a first end edge of an intumescent collar located at a first end of a pipe coupling to be mounted to a concrete form. The other end edge of the metallic band is spaced from a second end edge of the intumescent collar. The second end edge of the intumescent collar is abutted firmly against a protective flange which is molded as part of the pipe coupling and which covers the whole second end edge of the intumescent collar.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

FIG. 1 is an isometric view of a pipe coupling assembly according to principals of this invention;

FIG. 2 is an isometric, partially cutaway view of the assembly shown in FIG. 1 but mounted on a wooden form;

FIG. 3 is a side sectional view of another embodiment of this invention mounted on a wooden concrete form with concrete therein;

FIG. 4 is a side sectional view of another embodiment of this invention mounted on a metallic concrete form with concrete therein;

DESCRIPTION OF THE PREFERRED EMBODIMENT

Figure 5:
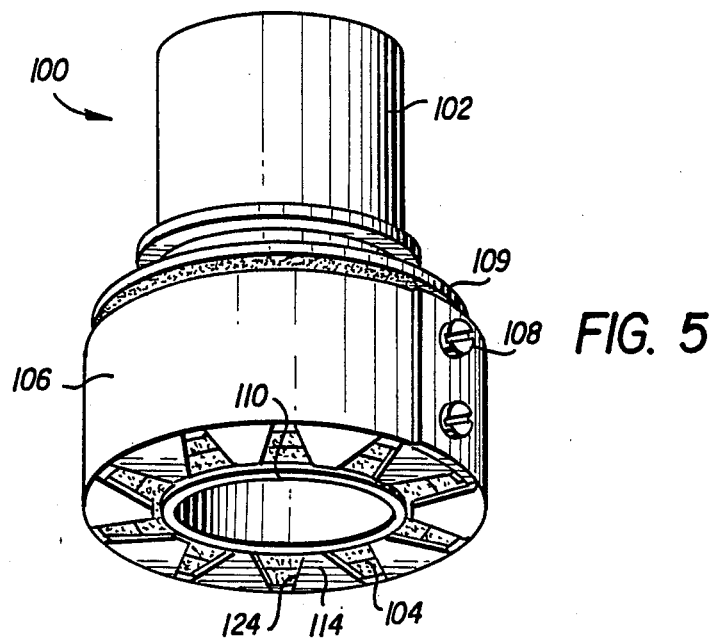
FIG. 5 is a bottom isometric view of another embodiment of this invention.

Referring now to FIGS. 1 and 2, a pipe coupling assembly 10 comprises a tubularly shaped pipe coupling 12, an intumescent collar 14 wrapped thereabout, a metallic band 16 wrapped about the intumescent collar 14, and elongated rivets 18.

The pipe coupling 12 has a tubularly shaped main body 20 with an internal shoulder 22 (FIG. 2) and an external riser flange 24. The internal shoulder 22 comes into contact with ends of pipes inserted into opposite ends 26 and 28 of the main body 20 to form a stop therefor. The external riser flange 24 protrudes from an outer surface 30 so as to form a lock with concrete in which the pipe coupling assembly 10 is embedded.

The intumescent collar 14 is shown in FIGS. 1 and 2 as being formed of two layers of wrap 32 and 34—the intumescent collar can be formed of one or more layers depending of the size of the pipe and the layers—and in the preferred embodiment, the intumescent fire proofing collar 14 is formed of materials sold under the designation fire barrier wrap/strip FS195 manufactured 3M of St. Paul, Minnesota, however, other materials currently manufactured by 3M or others can also be used. The metallic band 16 can be of a galvanized steel. The band 16 is formed of a strip which is bent into a circle so that ends 36 and 38 thereof overlap one another to form a complete ring. The method of constructing the pipe coupling assembly 10 is that the intumescent collar 14 is placed about the pipe coupling 12 with its lower edge at the lower end 40 of the pipe coupling 12 and the metallic band 16 is then wrapped about the outer surface of the intumescent collar with its lower, heat-receiving edge 41, at the lower end of the pipe coupling 12 and with the ends thereof 36 and 38 being caused to overlap. These ends, 36 and 38, are pulled tight so as to close the metallic band 16 tightly about the intumescent material thereby forcing the intumescent collar 14 against the outer surface of the pipe coupling 12 and causing it to be held thereto by friction. An adhesive could be used as well. Thereafter, elongated rivets 18 are passed through the metallic bands 16 at the overlapping areas to hold the band in the tight ring shape. These elongated rivets 18 are long so that they penetrate relatively deeply into the intumescent collar 14 as can be seen in FIG. 2, thereby fastening the metallic band 16 to the intumescent collar 14 and also forming heat conductors from the metallic band 16 into the intumescent collar 14.

The pipe coupling assembly 10 is shown in FIG. 2 frictionally held to a wooden concrete form 42 by means of an internal cup mounting member 44 which is screwed or otherwise fastened to the wooden concrete form 42. In this respect, the cup mounting member 44 has a peripheral surface 46 which makes frictional contact with the internal surface 48 of the pipe coupling 12. It should be understood that the pipe coupling assembly 10 is assembled in a factory and shipped and used as a unit.

The alternate embodiment of FIG. 3 differs from the embodiment of FIGS. 1 and 2 in that a pipe coupling 50 thereof includes both a riser flange 52 and a metal-band mounting flange 54 on the outer surface thereof. Also, in this embodiment a metal band 56 which surrounds an intumescent collar 14 is not formed of overlapping end members which are fastened together, but rather is a continuous cup with an upper, inwardly-directed, horizontal lip 58. The horizontal lip 58 rests on top of the metal-band mounting flange 54 to hold the metal band 56 on the pipe coupling 50. A round opening 59 defined by the horizontal lip is sufficiently large to pass over the riser flange 52 but not over the metal-band mounting flange 54. In this case, metallic screws 60 are passed through the wall of the metal band 56 into the intumescent collar 14 to serve as a heat conductor and also to firmly fasten the metal band 56 to the intumescent collar 14. The metal-band mounting flange 54 is clamped between the upper surface of the intumescent collar 14 and the lower surface of the horizontal lip 58 to firmly hold the metal band 56 and the intumescent collar 14 to the pipe coupling 50. The pipe coupling assembly 49 is shown held to a metallic concrete form 42a by means of the cup mounting member 44 which is welded at 62 to the concrete form 42a. Concrete 64 is shown in FIG. 3 in the concrete form 42 surrounding the pipe coupling assembly 49.

In the embodiment of FIG. 4, a pipe coupling assembly 64 comprises a pipe coupling 66, an intumescent collar 68 and a metallic band 70. In this case, the pipe coupling 66 is held to a metallic tunnel form 42b by a mounting device 72 having an annual slot 74 therein. The mounting device 72 is fastened to the metallic tunnel concrete form 42b by means of a weld 76 and also includes a secondary member 78 which is keyed to the mounting device 72 by a protrusion 80.

The pipe coupling 66 is retained in the annular slot 74 of the mounting device 72 by means of friction and the secondary member 78 which is coupled to the pipe coupling 66 by friction, provides additional support for the pipe coupling 66. When the form 42 is removed from a cured concrete barrier 82 the mounting device 72, which is attached to and part of the concrete form 42 goes with the concrete form 42, while the secondary member 72, which is gripped by an internal surface of the pipe coupling 66 by means of friction, stays with the pipe coupling 66. As in the other embodiments, the intumescent collar 68 is fastened to the pipe coupling 66 and the metallic band 70 is fastened to the intumescent collar 68. In the FIG. 4 embodiment, the intumescent collar 68 is shown attached to the pipe coupling 66 by means of an adhesive and the metallic band 70 is shown attached to the intumescent collar 68 by means of an adhesive. In this embodiment, the metallic band 70 is longer than the intumescent collar 68 so that it can extend down to a lower surface 84 of the concrete barrier 82 in order to conduct heat from the lower surface 84 up to the intumescent collar 68 once the mounting device 72 is removed. It should be understood that the metallic band 70 could be of a size for only covering the circumferential surface of the intumescent collar 68, however, if this were the case, it would take longer for the intumescent collar to receive heat from a fire on the floor below the concrete barrier 82.

In the embodiment of FIG. 5, a pipe coupling assembly 100 includes a pipe coupling 102, an intumescent collar 104, a metallic band 106, and screws 108. The pipe coupling 102 is somewhat different than the pipe coupling of the other embodiments in that it includes a protective annular-shaped flange 109 molded integrally, as one piece, with the remainder of the pipe coupling 102 to be located a distance from a first end 110 of the pipe coupling 102—which distance is equal to the axial length of the intumescent collar 104—and radially-directed heat receiver tabs 114 positioned at a first end 116 of the intumescent collar 104. The intumescent collar 104 is jammed tightly up against the protective flange 109 and the protective flange 109 has a radial dimension R such that it extends completely across a second end edge 118 of the intumescent collar 104 thus, the protective flange 109 protects the second end edge 118 of the intumescent collar 104 from water and concrete flowing into said edge; for example, from flowing between inner and outer layers 120 and 122 of the intumescent collar 104.

In this embodiment, the metallic band 106 has the heat receiver tabs 114 cut at its first end and bent to be directed radially inwardly. Thus, the heat receiver tabs 114 are nothing more than tabs having spaces 124 therebetween. These heat receiver tabs 114 provide a larger exposure area for the metallic band 106 to heat below a concrete floor 126 then does a thin edge but yet the spaces between the tabs allows heat from a fire to be transmitted directly to the first end 116 of the intumescent collar 104. A second, or upper, end edge 128 of the metallic band 106 is spaced about a quarter of an inch from the second end edge 118 of the intumescent collar 104. The reason for this spacing is to prevent heat from passing through the metallic band 106, thereby bypassing the intumescent collar 104, and melting the pipe coupling 102 above the second end edge 118 of the intumescent collar 104.

Figure 6:
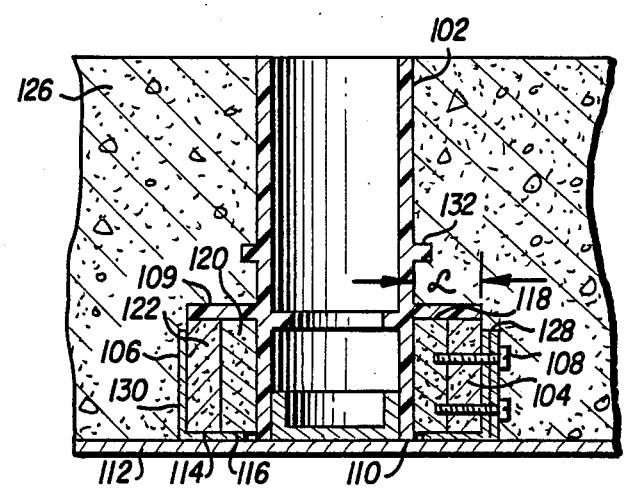
FIG. 6 is a side sectional view of the embodiment of FIG. 5 mounted on a concrete form with concrete therein.

The FIGS. 5 and 6 embodiment is a particularly durable and effective embodiment in that the protective flange 109 protects the second, or upper, end edge 118 of the intumescent collar 104 from water, grit, and the like. The heat receiver tabs 114 intercept more heat than is possible with a thin edge to transmit this heat up a tubular wall 130 of the metallic band 106. The spacing between the second end edge 128 of the metallic band 106 and the second end edge 118 of the intumescent collar 104 provides protection from the metallic band 106 causing heat to bypass the intumescent collar 104 to the flange 109 and the rest of the coupling 102.

It should be understood that in the embodiment of FIG. 5, many of the features are the same as for the other embodiments although not specifically discussed in relation to FIG. 5. For example, the intumescent collar 104 is clamped onto the pipe coupling 102 by tightly wrapping the metallic band 106 about the intumescent collar 104 and then screwing the ends of the metallic band 106 together with the screws 108 which extend into the intumescent collar 104.

In operation of all the above described embodiments of this invention, the intumescent collars and metallic bands are placed on pipe couplings at a factory and these pipe coupling assemblies are then shipped and sold as units. The metallic bands serve as protectors for the intumescent collars during transportation and use and force the intumescent collars tightly against the pipe couplings. At construction sites, these pipe coupling assemblies are mounted on concrete forms with the metallic bands thereof extending to the forms. When the forms are removed from cured barriers the edges of the metallic bands are exposed to the spaces below the barriers. If there are fires in the spaces below the barriers the exposed edges of the metallic bands receive the heat therefrom and conduct it throughout the metallic bands faster than surrounding concrete can conduct the heat away from the metallic bands. Thus, the metallic bands become hot and, in turn, heat the intumescent collars they surround.

The metallic fasteners extending through the metallic bands into the intumescent collars also become heated and conduct heat into the intumescent collars, thereby heating them faster.

It should be appreciated by those of ordinary skill in the art that the pipe coupling assemblies described herein can be easily manufactured in a factory to have a clean smooth appearance and can thereafter be shipped, stored, and used without undue fear of damaging the intumescent collars. In this respect, the metallic bands cover the outer circumference and thereby protect the intumescent collars from damage. Further, in some embodiments, the metallic band causes the metallic wrap to be tightly pressed against the outer surface of the pipe coupling so that the intumescent collar is held to the pipe coupling by friction.

It will also be appreciated by those of ordinary skill in the art that the pipe coupling assembly of this invention will quickly respond to the heat of fire from a space below a barrier in which the pipe coupling assembly is embedded to close off the pipe coupling. Still further, it will be appreciated by those of ordinary skill in the art that the manner of manufacturing the pipe coupling assembly of FIGS. 1 and 2 allows, in one step, the fastening of an intumescent collar to a pipe coupling and a metallic band to an intumescent collar.

While the invention has been particularly shown and described with reference to a preferred embodiment, it will be understood by those skilled in the art that various changes in form and detail may be made therein without departing from the spirit and scope of the invention. For example, it would be possible to have numerous fasteners passing through the metallic band and into the intumescent wrap to serve as a heat conductor, the heads thereof being shown in FIGS. 1 and 2. Such fasteners need not be utilized to fasten the ends of the metallic band together but being used rather only as heat conductors. It would also be possible to make the metallic band with internal protrusions in place of such fasteners. Further, it would be possible to include an adhesive between the intumescent collars and the pipe couplings to ensure that these members do not come apart. Still further, rather than the pipe couplings including internal shoulders, they could have bells at the ends thereof for receiving pipes. One bell could be extremely long so that it could be cut off to fit various-thickness barriers. Also, the exposed edges of the metallic bands could include flanges for picking up heat faster. Further, the cup mounting member 44 of FIG. 3 could also be mated with a secondary member of the type identified in FIG. 4 by reference numeral 78 where the metallic form 42a is a tunnel type, not allowing much clearance when it is pulled from the concrete. Also, a top edge 90 of the metallic band 16 (FIG. 1) could be slightly, around ¼ inch, below a top edge 92 of the intumescent collar 14 to avoid excess heat transfer above the intumescent material. Still further, a bottom edge of the metallic band could be turned inwardly, or include inwardly turned tabs, to provide additional support and containment to intumescent material and/or additional heat transfer for the FIG. 1–4 embodiments.

For the FIGS. 5 and 6 embodiment, it would be possible to extend radially the protective flange 109 even further than the intumescent collar 104 so that its radial outer end would be embedded in the concrete floor 126 for holding the pipe coupling 102 therein. If this were done, it would not be necessary to have a second protrusion 132 as is depicted in FIGS. 5 and 6. Similarly, it would be possible for the pipe coupling 102 to be of a type having pipe-receiving bells at opposite ends thereof to form female cavities for receiving pipes and a smaller central portion. If this were the type of pipe coupling 102 were, it would not be necessary to have a separate protrusion 132 for anchoring it in the concrete floor 126, since its shape would anchor it.

The embodiments of the invention in which an exclusive property or privilege are claimed are defined as follows:

1. A pipe coupling assembly product comprising:

a pipe coupling having an elongated tubularly-shaped main body with first and second ends, said elongated tubularly-shaped main body having an inner surface and an outer surface, said pipe coupling receiving pipes to be attached thereto at opposite ends;

an intumescent collar wrapped about and rigidly attached to the outer surface of said tubularly-shaped main body near the first end thereof with a corresponding first end edge of said intumescent collar being approximately adjacent said first end of said elongated tubularly-shaped main body, said intumescent collar being constructed of a material which expands when it, the material, gets hot to close off the inner surface of said tubularly-shaped main body;

a closed metallic band-wrapped about and rigidly attached about an outer circumferential periphery of said intumescent collar, said closed metallic band having a heat reception edge extending approximately to the first end of said pipe coupling, said metallic band being comprised of a band of metal having overlapping end portions fastened together by elongated fasteners which extend through said overlapping end portions into the intumescent collar so as to fasten said metallic band to said intumescent collar;

whereby said pipe coupling assembly can be attached to a concrete form with said heat reception edge of said metallic band being protected, concrete can be poured into said form and allowed to cure around said pipe coupling assembly including said closed metallic band and said intumescent collar to form a barrier, and after the form is removed, pipes can be attached to the ends of said pipe coupling to form a fire proof pipe string through said barrier with said heat reception edge of said metallic band being exposed to a space below said barrier.

2. A pipe coupling assembly product as in claim 1, wherein said fasteners are constructed of metal in order to form heat conductors extending from said material band into said intumescent collar.

3. A pipe coupling assembly product as in claim 2, wherein said metallic fasteners are rivets.

4. A pipe coupling assembly product as in claim 1, wherein a shoulder is formed on the inner surface of said elongated tubularly-shaped main body for abutting the ends of pipes inserted into said tubularly-shaped main body from opposite ends thereof.

5. A pipe coupling assembly product as in claim 4, wherein said elongated tubularly-shaped main body includes on an outer surface thereof a riser protrusion for locking said product against longitudinal movement in cement in which said product is embedded.

6. A pipe coupling assembly product as in claim 1, wherein said metallic band having a heat reception, first end edge extending approximately to the first end of said pipe coupling, said metallic band first end edge including radially directed heat receiver tabs positioned adjacent said intumescent-collar first end edge for receiving heat located thereat and transmitting to the rest of said metallic band.

7. A pipe coupling assembly product as in claim 1, wherein said intumescent collar has a second end edge which is positioned axially intermediate said first and second ends of said pipe coupling and wherein said elongated tubularly-shaped main body includes, integrally molded therewith, an annularly-shaped protective flange extending radially outwardly on an outer surface thereof at said intumescent collar second end edge, said intumescent collar's second end edge abutting said protective flange.

8. A pipe coupling assembly product as in claim 7, wherein said protective flange covers the entire intumescent-collar second end edge.

9. A pipe coupling assembly product comprising:

a pipe coupling having an elongated tubularly-shaped main body with first and second ends, said elongated tubularly-shaped main body having an inner surface and an outer surface, said pipe coupling receiving pipes to be attached thereto at opposite ends;

an intumescent collar wrapped about and attached to the outer surface of said tubularly-shaped main body near the first end thereof said intumescent collar being constructed of a material which expands when it, the material, gets hot to close off the inner surface of said tubularly-shaped main body;

a closed metallic band wrapped about and attached to an outer circumferential periphery of said intumescent collar, said closed metallic band having a heat reception edge extending approximately to the first end of said pipe coupling;

wherein said metallic band is comprised of a band of metal having overlapping end portions which are fastened together by elongate fasteners which extend through said overlapping end portions into the intumescent collar so as to fasten said metallic band to said intumescent collar;

whereby said pipe coupling assembly can be attached to a concrete form with said heat reception edge of said metallic band being protected, concrete can be poured into said form and allowed to cure around said pipe coupling assembly including said closed metallic band and said intumescent collar to form a barrier, and after the form is removed pipes can be attached to the ends of said pipe coupling to form a fire proof pipe string through said barrier with said heat reception edge of said metallic band being exposed to a space below said barrier.

10. A pipe coupling assembly product as in claim 9, wherein said fasteners are constructed of metal in order to form heat conductors extending from said metallic band into said intumescent collar.

11. A pipe coupling assembly product as in claim 10, wherein said metallic fasteners are rivets.

12. A pipe coupling assembly product comprising:

a pipe coupling having an elongated tubularly-shaped main body with first and second ends, said elongated tubularly-shaped pipe coupling receiving pipes attached thereto at opposite ends;

an intumescent collar wrapped about and attached to the outer surface of said tubularly-shaped main body near the first end thereof, said intumescent collar being constructed of a material which expands when it, the material, gets hot to close off the inner surface of said tubularly-shaped main body;

a closed metallic band wrapped about and attached to an outer circumferential periphery of said intumescent collar, said closed metallic band having a heat reception edge approximately at the first end of said pipe coupling;

wherein said intumescent collar and said closed metallic band have first end edges which are approximately adjacent to the first end of said pipe coupling and second end edges which are positioned axially intermediate said first and second ends of said pipe coupling, said metallic band's second end edge being located closer to said coupling first end then said intumescent collar's second end edge such that there is a substantial space between the metallic band second end edge and the intumescent collar second end edge, whereby heat traveling axially along said metallic band from said first end edge thereof to said second end edge thereof is prevented from melting said pipe coupling at said second end edge by said intumescent collar;

whereby said pipe coupling assembly can be attached to a concrete form with said heat reception edge of said metallic band being protected, concrete can be poured into said form and allowed to cure around said pipe coupling assembly including said closed metallic band and said intumescent collar to form a barrier, and after the form is removed pipes can be attached to the ends of said pipe coupling to form a fire proof pipe string through said barrier with said heat reception edge of said metallic band being exposed to a space below said barrier.

13. A pipe coupling assembly product as in claim 12, wherein said elongated tubularly-shaped main body includes integrally molded therewith, an annularly-shaped protective flange extending radially outwardly on an outer surface thereof at said intumescent collar second end edge, said intumescent collar's second end edge abutting said protective flange.

14. A pipe coupling assembly product as in claim 13, wherein said protective flange covers the entire intumescent-collar second end edge.

15. A pipe coupling assembly product as in claim 13, wherein said metallic band first end edge includes radially directed heat receiver tabs positioned adjacent said intumescent-collar first end edge for receiving heat located thereat and transmitting it to the rest of said metallic band.

16. A pipe coupling assembly product as in claim 12, wherein said metallic band first end edge includes radially directed heat receiver tabs positioned adjacent said intumescent-collar first end edge for receiving heat located thereat and transmitting it to the rest of said metallic band.

17. A pipe coupling assembly product comprising:
a pipe coupling having an elongated tubularly-shaped main body with first and second ends, said elongated tubularly-shaped main body having an inner surface and an outer surface, said pipe coupling receiving pipes to be attached thereto at opposite ends;
an intumescent collar wrapped about and rigidly attached to the outer surface of said tubularly-shaped main body near the first end thereof with a corresponding first end edge of said intumescent collar being approximately adjacent said first end of said elongated tubulary-shaped main body, said intumescent collar being constructed of a material which expands when it, the material, gets hot to close off the inner surface of said tubularly-shaped main body;
a closed metallic band wrapped about and rigidly attached about an outer circumferential periphery of said intumescent collar, said closed metallic band having a heat reception first edge extending approximately to the first end of said pipe coupling;
said closed metallic band and said intumescent collar having
second end edges which are positioned axially intermediate said first and second ends of said pipe coupling, said metallic band's second end edge being located closer to said coupling first end than said intumescent collar's second end edge such that there is a substantial space between the metallic band second end edge and the intumescent collar second end edge, whereby heat traveling axially along said metallic band from said first end edge thereof to said second end edge thereof is prevented from melting said pipe coupling at said second end edge;

whereby said pipe coupling assembly can be attached to a concrete form with said heat reception edge of said metallic band being protected, concrete can be poured into said form and allowed to cure around said pipe coupling assembly including said closed metallic band and said intumescent collar to form a barrier, and after the form is removed pipes can be attached to the ends of said pipe coupling to form a fire proof pipe string through said barrier with said heat reception edge of said metallic band being exposed to a space below said barrier.

18. A pipe coupling assembly product as in claim 17, wherein said intumescent collar has a second end edge which is positioned axially intermediate said first and second ends of said pipe coupling and said elongated tubularly-shaped main body includes integrally molded therewith, an annularly-shaped protective flange extending radially outwardly on an outer surface thereof at said intumescent collar's second end edge, said intumescent collar's second end edge abutting said protective flange.

19. A pipe coupling assembly product as in claim 18, wherein said protective flange covers the entire intumescent-collar second end edge.

20. A pipe coupling assembly product as in claim 18, wherein said metallic band first end edge includes radially directed heat receiver tabs positioned adjacent said intumescent-collar first end edge for receiving heat located thereat and transmitting it to the rest of said metallic band.

21. A pipe coupling assembly product as in claim 17, wherein said metallic band first end edge includes radially directed heat receiver tabs positioned adjacent said intumescent-collar first end edge for receiving heat located thereat and transmitting it to the rest of said metallic band.

22. A pipe coupling assembly product comprising:
a pipe coupling having an elongated tubularly-shaped main body with first and second ends, said elongated tubularly-shaped main body having an inner surface and an outer surface, said pipe coupling receiving pipes to be attached thereto at opposite ends;
an intumescent collar wrapped about and rigidly attached to the outer surface of said tubulary-shaped main body near the first end thereof with a corresponding first end edge of said intumescent collar being approximately adjacent said first end of said elongated tubulary-shaped main body, said intumescent collar being constructed of a material which expands when it, the material, gets hot to close off the inner surface of said tubularly-shaped main body;

a closed metallic band wrapped about and rigidly attached about an outer circumferential periphery of said intumescent collar, said closed metallic band having a heat reception edge extending approximately to the first end of said pipe coupling wherein said intumescent collar has a second end edge which is positioned axially intermediate said first and second ends of said coupling and wherein said elongated tubularly-shaped main body includes, integrally molded therewith, an annularly-shaped protective flange extending radially outwardly on an outer surface thereof at said intumescent collar second end edge, said intumescent collar's second end edge abutting said protective flange and said protective flange covering the entire intumescent-collar second end edge;

whereby said pipe coupling assembly can be attached to a concrete form with said heat reception edge of said metallic band being protected, concrete can be poured into said form and allows to cure around said pipe coupling assembly including said closed metallic band and said intumescent collar to form a barrier, and after the form is removed pipes can be attached to the ends of said pipe coupling to form a fire proof pipe string through said barrier with said heat reception edge of said metallic band being exposed to a space below said barrier.

* * * * *